United States Patent
Hsu et al.

(10) Patent No.: US 9,335,520 B2
(45) Date of Patent: May 10, 2016

(54) IMAGING LENS, AND ELECTRONIC APPARATUS INCLUDING THE SAME

(71) Applicant: Genius Electronic Optical Co., Ltd., Central Taiwan Science Park (TW)

(72) Inventors: Sheng-Wei Hsu, Central Taiwan Science Park (TW); Chih-Yang Yeh, Central Taiwan Science Park (TW); Tzu-Chien Tang, Central Taiwan Science Park (TW)

(73) Assignee: Genius Electronic Optical Co., Ltd., Taichung (TW)

(*) Notice: Subject to any disclaimer, the term of this patent is extended or adjusted under 35 U.S.C. 154(b) by 0 days.

(21) Appl. No.: 14/554,212

(22) Filed: Nov. 26, 2014

(65) Prior Publication Data

US 2016/0062085 A1 Mar. 3, 2016

(30) Foreign Application Priority Data

Aug. 27, 2014 (TW) .............................. 103129543 A

(51) Int. Cl.
*G02B 9/60* (2006.01)
*G02B 13/00* (2006.01)

(52) U.S. Cl.
CPC .............. *G02B 13/0045* (2013.01); *G02B 9/60* (2013.01)

(58) Field of Classification Search
CPC .............. G02B 9/60; G02B 9/62; G02B 9/64; G02B 13/0045
USPC .......... 359/754–759, 761–765, 767, 769, 770
See application file for complete search history.

(56) References Cited

U.S. PATENT DOCUMENTS

| 8,760,775 | B2 | 6/2014 | Shinohara | |
|---|---|---|---|---|
| 2007/0236811 | A1* | 10/2007 | Mori | ........................ G02B 9/34 359/770 |
| 2013/0021679 | A1 | 1/2013 | Tsai et al. | |
| 2013/0033765 | A1 | 2/2013 | Tsai et al. | |
| 2014/0029115 | A1* | 1/2014 | Liao | ........................ G02B 13/06 359/713 |
| 2014/0078600 | A1 | 3/2014 | Shinohara | |

FOREIGN PATENT DOCUMENTS

| JP | 5021565 | 9/2012 |
|---|---|---|
| JP | 5177776 | 4/2013 |
| JP | 2013-156389 | 8/2013 |
| JP | 2014-29547 | 2/2014 |
| TW | 201331619 A1 | 8/2013 |
| TW | 201413282 | 4/2014 |
| TW | 201418762 | 5/2014 |
| TW | 201439581 A | 10/2014 |
| TW | 201441652 A | 11/2014 |
| TW | 201441653 A | 11/2014 |
| TW | 201441654 A | 11/2014 |

OTHER PUBLICATIONS

"Office Action of Taiwan Counterpart Application," issued on Nov. 5, 2015, p. 1-p. 7, in which the listed references were cited.

* cited by examiner

*Primary Examiner* — Darryl J Collins
(74) *Attorney, Agent, or Firm* — Jianq Chyun IP Office

(57) ABSTRACT

An imaging lens includes first to fifth lens elements arranged from an object side to an image side in the given order. Through designs of surfaces of the lens elements and relevant optical parameters, a short system length of the imaging lens may be achieved while maintaining good optical performance.

17 Claims, 24 Drawing Sheets

| system focal length =2.632mm , half field-of-view=39.882°, F-number =2.050, system length=3.648mm ||||||
|---|---|---|---|---|---|
| lens element | surface | radius of curvature | thickness | refractive index | Abbe number | focal length |
| object | | ∞ | ∞ | | | |
| aperture stop 2 | | ∞ | 0.453 | | | |
| first lens element 3 | object-side surface 31 | 1.479 | 0.453 | 1.546 | 56.114 | 2.972 |
| | image-side surface 32 | 14.868 | 0.084 | | | |
| second lens element 4 | object-side surface 41 | 10.589 | 0.220 | 1.648 | 22.397 | -11.695 |
| | image-side surface 42 | 4.381 | 0.271 | | | |
| third lens element 5 | object-side surface 51 | 39.057 | 0.227 | 1.648 | 22.397 | -7.124 |
| | image-side surface 52 | 4.118 | 0.112 | | | |
| fourth lens element 6 | object-side surface 61 | -4.777 | 0.645 | 1.546 | 56.114 | 1.425 |
| | image-side surface 62 | -0.701 | 0.269 | | | |
| fifth lens element 7 | object-side surface 71 | 12.783 | 0.300 | 1.546 | 56.114 | -1.677 |
| | image-side surface 72 | 0.847 | 0.554 | | | |
| optical filter 8 | object-side surface 81 | ∞ | 0.210 | | | |
| | image-side surface 82 | ∞ | 0.263 | | | |
| image plane 100 | | ∞ | 0.040 | | | |

FIG.3

| surface | 31 | 32 | 41 | 42 | 51 |
|---|---|---|---|---|---|
| K | 9.52E-03 | 1.45E-11 | -4.07E-11 | 1.22E-09 | -1.21E-12 |
| a4 | -9.05E-02 | -1.78E-01 | -2.72E-01 | -2.41E-01 | -1.02E+00 |
| a6 | 1.11E+00 | -4.14E-01 | 4.24E-02 | 3.80E-01 | 5.04E+00 |
| a8 | -1.02E+01 | 2.52E+00 | 3.60E-01 | -1.10E+00 | -4.18E+01 |
| a10 | 5.02E+01 | -1.13E+01 | -2.39E+00 | 7.11E-01 | 2.25E+02 |
| a12 | -1.43E+02 | 2.20E+01 | -1.76E+00 | -5.53E-01 | -7.80E+02 |
| a14 | 2.20E+02 | -2.13E+01 | 1.25E+01 | 2.83E-01 | 1.71E+03 |
| a16 | -1.55E+02 | 8.89E+00 | -9.38E+00 | -3.00E-02 | -2.28E+03 |
| a18 | 2.41E+01 | 0.00E+00 | 0.00E+00 | 0.00E+00 | 1.68E+03 |
| a20 | 0.00E+00 | 0.00E+00 | 0.00E+00 | 0.00E+00 | -5.23E+02 |
| surface | 52 | 61 | 62 | 71 | 72 |
| K | -1.51E-09 | -4.50E-09 | -9.99E-01 | 2.94E-10 | -1.00E+00 |
| a4 | -6.05E-01 | 7.66E-02 | 6.40E-01 | 2.03E-01 | -7.40E-01 |
| a6 | 9.62E-01 | -4.55E-01 | -1.74E+00 | -1.61E+00 | 7.30E-01 |
| a8 | -3.78E+00 | 1.15E+00 | 4.10E+00 | 3.60E+00 | -5.74E-01 |
| a10 | 1.33E+01 | -9.60E-01 | -7.26E+00 | -4.62E+00 | 3.41E-01 |
| a12 | -3.12E+01 | 1.64E-01 | 9.96E+00 | 3.75E+00 | -1.51E-01 |
| a14 | 4.78E+01 | 1.59E-01 | -9.19E+00 | -1.95E+00 | 4.84E-02 |
| a16 | -4.40E+01 | -6.36E-02 | 5.12E+00 | 6.20E-01 | -1.03E-02 |
| a18 | 2.18E+01 | 0.00E+00 | -1.54E+00 | -1.10E-01 | 1.29E-03 |
| a20 | -4.47E+00 | 0.00E+00 | 1.90E-01 | 8.38E-03 | -6.91E-05 |

FIG.4 system focal length =2.641mm, half field-of-view=39.935°, F-number =2.050, system length=3.646mm

| lens element | surface | radius of curvature | thickness | refractive index | Abbe number | focal length |
|---|---|---|---|---|---|---|
| object | | ∞ | ∞ | | | |
| aperture stop 2 | | ∞ | 0.449 | | | |
| first lens element 3 | object-side surface 31 | 1.475 | 0.082 | 1.546 | 56.114 | 2.989 |
| | image-side surface 32 | 13.689 | 0.220 | | | |
| second lens element 4 | object-side surface 41 | 11.549 | 0.261 | 1.648 | 22.397 | -12.007 |
| | image-side surface 42 | 4.613 | 0.241 | | | |
| third lens element 5 | object-side surface 51 | 55.197 | 0.132 | 1.648 | 22.397 | -7.477 |
| | image-side surface 52 | 4.446 | 0.604 | | | |
| fourth lens element 6 | object-side surface 61 | -4.387 | 0.261 | 1.546 | 56.114 | 1.459 |
| | image-side surface 62 | -0.707 | 0.315 | | | |
| fifth lens element 7 | object-side surface 71 | 10.843 | 0.554 | 1.546 | 56.114 | -1.714 |
| | image-side surface 72 | 0.853 | 0.210 | | | |
| optical filter 8 | object-side surface 81 | ∞ | 0.275 | | | |
| | image-side surface 82 | ∞ | 0.042 | | | |
| image plane 100 | | ∞ | | | | |

FIG.7

| surface | 31 | 32 | 41 | 42 | 51 |
|---|---|---|---|---|---|
| K | 7.01E-03 | -2.32E-11 | 7.69E-11 | -6.04E-09 | 2.57E-12 |
| a4 | -1.10E-01 | -1.75E-01 | -2.71E-01 | -2.35E-01 | -1.01E+00 |
| a6 | 1.92E+00 | -5.43E-01 | 1.51E-02 | 2.35E-01 | 4.97E+00 |
| a8 | -2.24E+01 | 3.85E+00 | 9.86E-01 | -4.81E-02 | -4.11E+01 |
| a10 | 1.46E+02 | -1.81E+01 | -6.15E+00 | -3.24E+00 | 2.21E+02 |
| a12 | -5.69E+02 | 4.01E+01 | 8.65E+00 | 7.57E+00 | -7.65E+02 |
| a14 | 1.29E+03 | -4.60E+01 | -1.30E+01 | -8.33E+00 | 1.67E+03 |
| a16 | -1.60E+03 | 2.24E+01 | -2.29E+00 | 3.65E+00 | -2.22E+03 |
| a18 | 8.22E+02 | 0.00E+00 | 0.00E+00 | 0.00E+00 | 1.63E+03 |
| a20 | 0.00E+00 | 0.00E+00 | 0.00E+00 | 0.00E+00 | -5.08E+02 |
| surface | 52 | 61 | 62 | 71 | 72 |
| K | -8.00E-09 | 1.95E-09 | -1.01E+00 | 1.05E-09 | -1.00E+00 |
| a4 | -6.00E-01 | 7.65E-02 | 6.42E-01 | 2.06E-01 | -7.40E-01 |
| a6 | 7.98E-01 | -4.39E-01 | -1.72E+00 | -1.64E+00 | 7.33E-01 |
| a8 | -2.18E+00 | 1.03E+00 | 3.95E+00 | 3.67E+00 | -5.82E-01 |
| a10 | 5.43E+00 | -7.09E-01 | -6.67E+00 | -4.74E+00 | 3.50E-01 |
| a12 | -8.52E+00 | -6.93E-02 | 8.76E+00 | 3.87E+00 | -1.57E-01 |
| a14 | 7.96E+00 | 2.56E-01 | -7.73E+00 | -2.02E+00 | 5.08E-02 |
| a16 | -1.95E+00 | -7.79E-02 | 4.02E+00 | 6.46E-01 | -1.09E-02 |
| a18 | -2.55E+00 | 0.00E+00 | -1.07E+00 | -1.16E-01 | 1.36E-03 |
| a20 | 1.48E+00 | 0.00E+00 | 1.08E-01 | 8.81E-03 | -7.33E-05 |

FIG.8

| system focal length =2.950mm, half field-of-view=37.032°, F-number =2.050, system length=3.800mm | | | | | | |
|---|---|---|---|---|---|---|
| lens element | surface | radius of curvature | thickness | refractive index | Abbe number | focal length |
| object | | ∞ | ∞ | | | |
| aperture stop 2 | | ∞ | 0.511 | | | |
| first lens element 3 | object-side surface 31 | 1.431 | 0.511 | 1.546 | 56.114 | 3.615 |
| | image-side surface 32 | 4.545 | 0.087 | | | |
| second lens element 4 | object-side surface 41 | 3.582 | 0.242 | 1.648 | 22.397 | -56.205 |
| | image-side surface 42 | 3.175 | 0.264 | | | |
| third lens element 5 | object-side surface 51 | 15.159 | 0.220 | 1.648 | 22.397 | -6.679 |
| | image-side surface 52 | 3.347 | 0.155 | | | |
| fourth lens element 6 | object-side surface 61 | -4.757 | 0.618 | 1.546 | 56.114 | 1.478 |
| | image-side surface 62 | -0.722 | 0.237 | | | |
| fifth lens element 7 | object-side surface 71 | 55.722 | 0.300 | 1.546 | 56.114 | -1.689 |
| | image-side surface 72 | 0.905 | 0.554 | | | |
| optical filter 8 | object-side surface 81 | ∞ | 0.210 | | | |
| | image-side surface 82 | ∞ | 0.400 | | | |
| image plane 100 | | | 0.003 | | | |

FIG.11

| surface | 31 | 32 | 41 | 42 | 51 |
|---|---|---|---|---|---|
| K | 2.15E-01 | 9.18E-08 | 8.32E-02 | 6.32E-01 | -3.64E-09 |
| a4 | -6.39E-02 | -1.93E-01 | -2.57E-01 | -2.23E-01 | -8.77E-01 |
| a6 | 7.80E-01 | -2.58E-01 | 1.60E-02 | 2.01E-01 | 2.65E+00 |
| a8 | -8.33E+00 | 2.10E+00 | 6.20E-01 | 2.55E-01 | -2.00E+01 |
| a10 | 4.79E+01 | -1.11E+01 | -4.99E+00 | -5.12E+00 | 1.03E+02 |
| a12 | -1.62E+02 | 2.53E+01 | 9.55E+00 | 1.32E+01 | -3.35E+02 |
| a14 | 3.18E+02 | -2.86E+01 | -7.27E+00 | -1.60E+01 | 6.80E+02 |
| a16 | -3.34E+02 | 1.34E+01 | 2.47E+00 | 7.73E+00 | -8.19E+02 |
| a18 | 1.46E+02 | 0.00E+00 | 0.00E+00 | 0.00E+00 | 5.32E+02 |
| a20 | 0.00E+00 | 0.00E+00 | 0.00E+00 | 0.00E+00 | -1.41E+02 |
| surface | 52 | 61 | 62 | 71 | 72 |
| K | 9.12E-02 | -5.38E-01 | -1.00E+00 | 2.27E-09 | -9.89E-01 |
| a4 | -6.49E-01 | 6.45E-02 | 6.30E-01 | 1.81E-01 | -7.68E-01 |
| a6 | 1.17E+00 | -2.77E-01 | -1.48E+00 | -1.67E+00 | 7.94E-01 |
| a8 | -4.13E+00 | 6.76E-01 | 2.68E+00 | 3.95E+00 | -6.43E-01 |
| a10 | 1.19E+01 | -4.46E-01 | -3.01E+00 | -5.33E+00 | 3.76E-01 |
| a12 | -2.12E+01 | -6.48E-02 | 2.48E+00 | 4.53E+00 | -1.57E-01 |
| a14 | 2.15E+01 | 1.57E-01 | -1.27E+00 | -2.45E+00 | 4.54E-02 |
| a16 | -8.76E+00 | -4.02E-02 | 1.46E-01 | 8.11E-01 | -8.50E-03 |
| a18 | -1.94E+00 | 0.00E+00 | 1.64E-01 | -1.50E-01 | 8.93E-04 |
| a20 | 1.94E+00 | 0.00E+00 | -5.35E-02 | 1.18E-02 | -3.71E-05 |

FIG.12

| system focal length =2.654mm , half field-of-view=40.145°, F-number =2.050, system length=3.679mm | | | | | | |
|---|---|---|---|---|---|---|
| lens element | surface | radius of curvature | thickness | refractive index | Abbe number | focal length |
| object | | ∞ | ∞ | | | |
| aperture stop 2 | | ∞ | 0.532 | | | |
| first lens element 3 | object-side surface 31 | 1.525 | 0.250 | 1.546 | 56.114 | 2.943 |
| | image-side surface 32 | 26.254 | 0.220 | | | |
| second lens element 4 | object-side surface 41 | -4.787 | 0.050 | 1.648 | 22.397 | -4.562 |
| | image-side surface 42 | 7.869 | 0.220 | | | |
| third lens element 5 | object-side surface 51 | 2.505 | 0.127 | 1.648 | 22.397 | 322.400 |
| | image-side surface 52 | 2.447 | 0.660 | | | |
| fourth lens element 6 | object-side surface 61 | -4.880 | 0.233 | 1.546 | 56.114 | 1.433 |
| | image-side surface 62 | -0.706 | 0.340 | | | |
| fifth lens element 7 | object-side surface 71 | 17.041 | 0.554 | 1.546 | 56.114 | -1.653 |
| | image-side surface 72 | 0.851 | 0.210 | | | |
| optical filter 8 | object-side surface 81 | ∞ | 0.276 | | | |
| | image-side surface 82 | ∞ | 0.007 | | | |
| image plane 100 | | | | | | |

FIG.15

| surface | 31 | 32 | 41 | 42 | 51 |
|---|---|---|---|---|---|
| K | -1.09E-01 | -6.21E-11 | -2.89E-09 | -1.22E-08 | 5.72E-02 |
| a4 | -3.27E-02 | -1.81E-01 | -1.49E-01 | -2.54E-01 | -8.49E-01 |
| a6 | -2.43E-02 | 1.76E-01 | -1.55E-01 | 2.80E-01 | 1.89E+00 |
| a8 | 8.63E-02 | -2.99E+00 | -1.73E+00 | -4.43E-01 | -9.42E+00 |
| a10 | -5.03E+00 | 1.21E+01 | 6.57E+00 | -2.20E+00 | 3.85E+01 |
| a12 | 3.62E+01 | -2.80E+01 | -1.33E+01 | 7.33E+00 | -1.10E+02 |
| a14 | -1.24E+02 | 3.34E+01 | 1.34E+01 | -1.07E+01 | 1.97E+02 |
| a16 | 2.06E+02 | -1.60E+01 | -4.12E+00 | 5.95E+00 | -2.03E+02 |
| a18 | -1.35E+02 | 0.00E+00 | 0.00E+00 | 0.00E+00 | 1.05E+02 |
| a20 | 0.00E+00 | 0.00E+00 | 0.00E+00 | 0.00E+00 | -1.91E+01 |
| surface | 52 | 61 | 62 | 71 | 72 |
| K | 3.51E-01 | -5.06E-08 | -9.78E-01 | 3.60E-09 | -1.01E+00 |
| a4 | -5.51E-01 | 1.41E-02 | 6.68E-01 | 2.04E-01 | -7.33E-01 |
| a6 | 4.44E-01 | -1.76E-01 | -2.02E+00 | -1.69E+00 | 7.14E-01 |
| a8 | 1.13E+00 | 7.84E-01 | 5.41E+00 | 3.90E+00 | -5.40E-01 |
| a10 | -1.05E+01 | -3.94E-01 | -1.09E+01 | -5.19E+00 | 2.96E-01 |
| a12 | 3.80E+01 | -1.09E+00 | 1.61E+01 | 4.38E+00 | -1.17E-01 |
| a14 | -7.70E+01 | 1.35E+00 | -1.52E+01 | -2.36E+00 | 3.24E-02 |
| a16 | 9.02E+01 | -4.37E-01 | 8.24E+00 | 7.83E-01 | -5.96E-03 |
| a18 | -5.64E+01 | 0.00E+00 | -2.26E+00 | -1.45E-01 | 6.42E-04 |
| a20 | 1.45E+01 | 0.00E+00 | 2.31E-01 | 1.15E-02 | -2.97E-05 |

FIG.16 system focal length =2.815mm, half field-of-view=38.160°, F-number =2.050, system length=3.800mm

| lens element | surface | radius of curvature | thickness | refractive index | Abbe number | focal length |
|---|---|---|---|---|---|---|
| object | | ∞ | ∞ | | | |
| aperture stop 2 | | ∞ | 0.457 | | | |
| first lens element 3 | object-side surface 31 | 1.538 | 0.457 | 1.546 | 56.114 | 3.308 |
| | image-side surface 32 | 9.302 | 0.310 | | | |
| second lens element 4 | object-side surface 41 | -10.266 | 0.220 | 1.648 | 22.397 | -4.381 |
| | image-side surface 42 | 3.956 | 0.050 | | | |
| third lens element 5 | object-side surface 51 | 2.089 | 0.220 | 1.648 | 22.397 | 16.767 |
| | image-side surface 52 | 2.479 | 0.211 | | | |
| fourth lens element 6 | object-side surface 61 | -4.361 | 0.559 | 1.546 | 56.114 | 1.774 |
| | image-side surface 62 | -0.828 | 0.331 | | | |
| fifth lens element 7 | object-side surface 71 | 45.365 | 0.410 | 1.546 | 56.114 | -2.080 |
| | image-side surface 72 | 1.104 | 0.554 | | | |
| optical filter 8 | object-side surface 81 | ∞ | 0.210 | | | |
| | image-side surface 82 | ∞ | 0.250 | | | |
| image plane 100 | | | 0.018 | | | |

FIG.19

| surface | 31 | 32 | 41 | 42 | 51 |
|---|---|---|---|---|---|
| K | 4.14E-02 | 4.59E-10 | -1.65E-08 | -1.58E-01 | 9.11E-01 |
| a4 | -4.39E-02 | -1.05E-01 | -7.90E-02 | -2.61E-01 | -8.31E-01 |
| a6 | 1.90E-01 | -7.94E-02 | -4.03E-01 | 3.49E-01 | 2.00E+00 |
| a8 | -1.36E+00 | -7.81E-01 | -9.82E-01 | -9.41E-01 | -9.17E+00 |
| a10 | 1.39E+00 | 2.96E+00 | 5.39E+00 | -7.54E-01 | 3.41E+01 |
| a12 | 1.44E+01 | -6.87E+00 | -1.25E+01 | 4.79E+00 | -8.77E+01 |
| a14 | -6.61E+01 | 7.67E+00 | 1.37E+01 | -7.41E+00 | 1.41E+02 |
| a16 | 1.10E+02 | -3.28E+00 | -4.94E+00 | 4.03E+00 | -1.32E+02 |
| a18 | -6.65E+01 | 0.00E+00 | 0.00E+00 | 0.00E+00 | 6.13E+01 |
| a20 | 0.00E+00 | 0.00E+00 | 0.00E+00 | 0.00E+00 | -9.71E+00 |
| surface | 52 | 61 | 62 | 71 | 72 |
| K | 4.14E-02 | 4.59E-10 | -1.65E-08 | -1.58E-01 | 9.11E-01 |
| a4 | -4.39E-02 | -1.05E-01 | -7.90E-02 | -2.61E-01 | -8.31E-01 |
| a6 | 1.90E-01 | -7.94E-02 | -4.03E-01 | 3.49E-01 | 2.00E+00 |
| a8 | -1.36E+00 | -7.81E-01 | -9.82E-01 | -9.41E-01 | -9.17E+00 |
| a10 | 1.39E+00 | 2.96E+00 | 5.39E+00 | -7.54E-01 | 3.41E+01 |
| a12 | 1.44E+01 | -6.87E+00 | -1.25E+01 | 4.79E+00 | -8.77E+01 |
| a14 | -6.61E+01 | 7.67E+00 | 1.37E+01 | -7.41E+00 | 1.41E+02 |
| a16 | 1.10E+02 | -3.28E+00 | -4.94E+00 | 4.03E+00 | -1.32E+02 |
| a18 | -6.65E+01 | 0.00E+00 | 0.00E+00 | 0.00E+00 | 6.13E+01 |
| a20 | 0.00E+00 | 0.00E+00 | 0.00E+00 | 0.00E+00 | -9.71E+00 |

FIG.20

| relationship | first preferred embodiment | second preferred embodiment | third preferred embodiment | fourth preferred embodiment | fifth preferred embodiment |
|---|---|---|---|---|---|
| T5/G23 | 1.106 | 1.207 | 1.139 | 6.795 | 8.194 |
| ALT/G23 | 6.800 | 7.003 | 7.171 | 39.435 | 37.328 |
| Gaa/T3 | 3.245 | 3.049 | 3.374 | 2.997 | 4.097 |
| T4/T2 | 2.931 | 2.745 | 2.557 | 2.999 | 2.543 |
| EFL/T3 | 11.600 | 10.938 | 13.409 | 12.064 | 12.795 |
| T4/T3 | 2.842 | 2.501 | 2.807 | 2.999 | 2.543 |
| T1/T5 | 1.509 | 1.423 | 1.702 | 1.567 | 1.116 |
| T5/G34 | 2.685 | 2.392 | 1.939 | 2.683 | 1.943 |
| G45/(G12+G34) | 1.370 | 1.222 | 0.977 | 0.619 | 0.635 |
| EFL/T5 | 8.773 | 8.375 | 9.828 | 7.811 | 6.871 |
| ALT/T3 | 8.130 | 7.576 | 8.591 | 8.963 | 8.484 |
| T5/T3 | 1.322 | 1.306 | 1.364 | 1.544 | 1.862 |
| T4/(T2+T3) | 1.443 | 1.309 | 1.338 | 1.499 | 1.271 |
| Gaa/T5 | 2.454 | 2.334 | 2.473 | 1.941 | 2.200 |

FIG.22

IMAGING LENS, AND ELECTRONIC APPARATUS INCLUDING THE SAME

CROSS-REFERENCE TO RELATED APPLICATION

This application claims priority to Taiwanese Application No. 103129543, filed on Aug. 27, 2014.

FIELD OF THE INVENTION

The present invention relates to an imaging lens and an electronic apparatus including the same.

BACKGROUND OF THE INVENTION

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance. Imaging quality and size are two of the most important characteristics for an imaging lens.

Each of U.S. Pat. No. 8,760,775 and U.S. patent application publication no. 20140078600 discloses a conventional imaging lens that includes five lens elements. However, a system length of such a conventional imaging lens is unable to be effectively reduced to a certain length that meets a thinner product design of mobile phone requirements.

Therefore, technical difficulties of a miniaturized imaging lens are higher than those of traditional imaging lenses. Producing an imaging lens that meets requirements of consumer electronic products with satisfactory optical performance is always a goal in the industry.

SUMMARY OF THE INVENTION

An object of the present invention is to provide an imaging lens having a shorter overall length while maintaining good optical performance.

According to one aspect of the present invention, an imaging lens comprises an aperture stop, a first lens element, a second lens element, a third lens element, a fourth lens element and a fifth lens element arranged in order from an object side to an image side along an optical axis of the imaging lens. Each of the first lens element, the second lens element, the third lens element, the fourth lens element and the fifth lens element has a refractive power, an object-side surface facing toward the object side, and an image-side surface facing toward the image side.

The image-side surface of the first lens element has a convex portion in a vicinity of a periphery of the first lens element.

The object-side surface of the second lens element has a concave portion in a vicinity of a periphery of the second lens element, and the image-side surface of the second lens element has a concave portion in a vicinity of the optical axis, and a convex portion in a vicinity of the periphery of the second lens element.

The object-side surface of the third lens element has a concave portion in a vicinity of a periphery of the third lens element.

The fourth lens element has a positive refractive power, and the object-side surface of the fourth lens element has a concave portion in a vicinity of the optical axis.

The object-side surface of the fifth lens element has a convex portion in a vicinity of the optical axis.

The imaging lens satisfies $T5/G23 \geq 1.1$ and $G45 > G34$, where $G23$ represents an air gap length between the second lens element and the third lens element at the optical axis, $G34$ represents an air gap length between the third lens element and the fourth lens element at the optical axis, $G45$ represents an air gap length between the fourth lens element and the fifth lens element at the optical axis, and $T5$ represents a thickness of the fifth lens element at the optical axis.

Another object of the present invention is to provide an electronic apparatus having an imaging lens with five lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the embodiments with reference to the accompanying drawings, of which:

FIG. 3 shows values of some optical data corresponding to the imaging lens of the first embodiment;

FIG. 4 shows values of some aspherical coefficients corresponding to the imaging lens of the first embodiment;

FIG. 7 shows values of some optical data corresponding to the imaging lens of the second embodiment;

FIG. 8 shows values of some aspherical coefficients corresponding to the imaging lens of the second embodiment;

FIG. 11 shows values of some optical data corresponding to the imaging lens of the third embodiment;

FIG. 12 shows values of some aspherical coefficients corresponding to the imaging lens of the third embodiment;

FIG. 15 shows values of some optical data corresponding to the imaging lens of the fourth embodiment;

FIG. 16 shows values of some aspherical coefficients corresponding to the imaging lens of the fourth embodiment;

FIG. 19 shows values of some optical data corresponding to the imaging lens of the fifth embodiment;

FIG. 20 shows values of some aspherical coefficients corresponding to the imaging lens of the fifth embodiment;

FIG. 22 is a table that lists values of relationships among some lens parameters corresponding to the imaging lenses of the first to fifth embodiments;

DETAILED DESCRIPTION OF THE EMBODIMENTS

Figure 1:
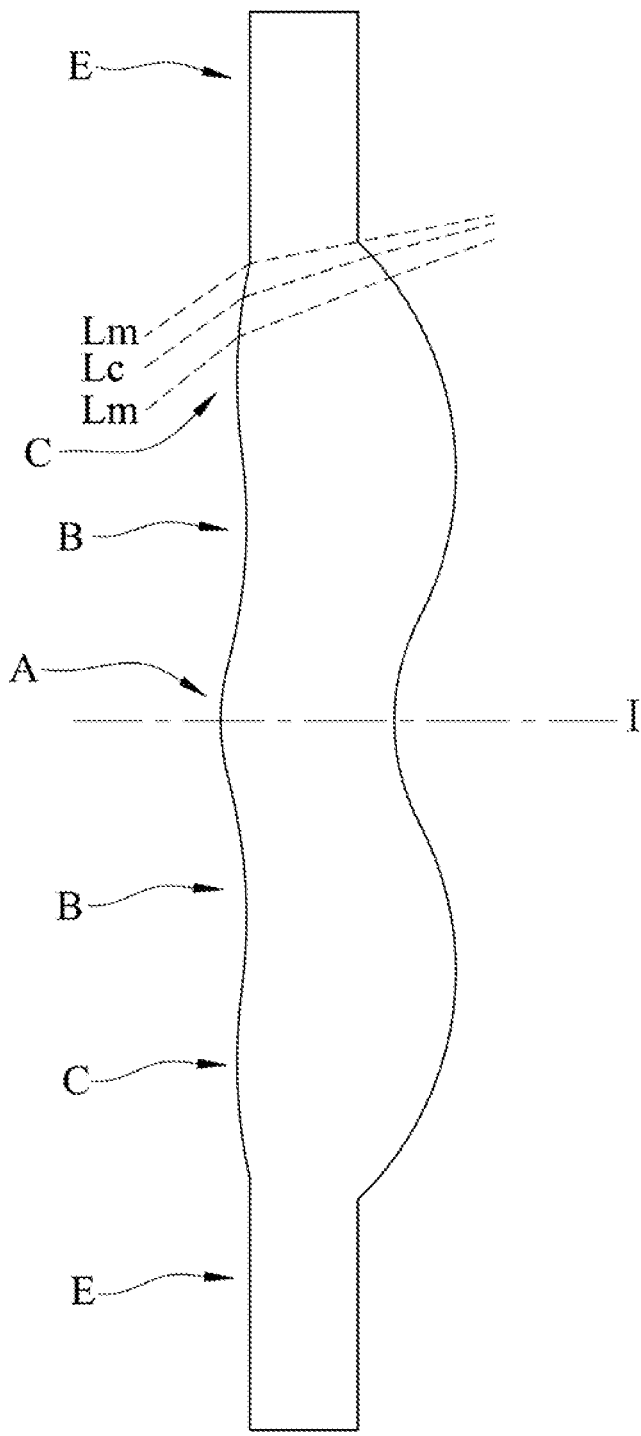
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
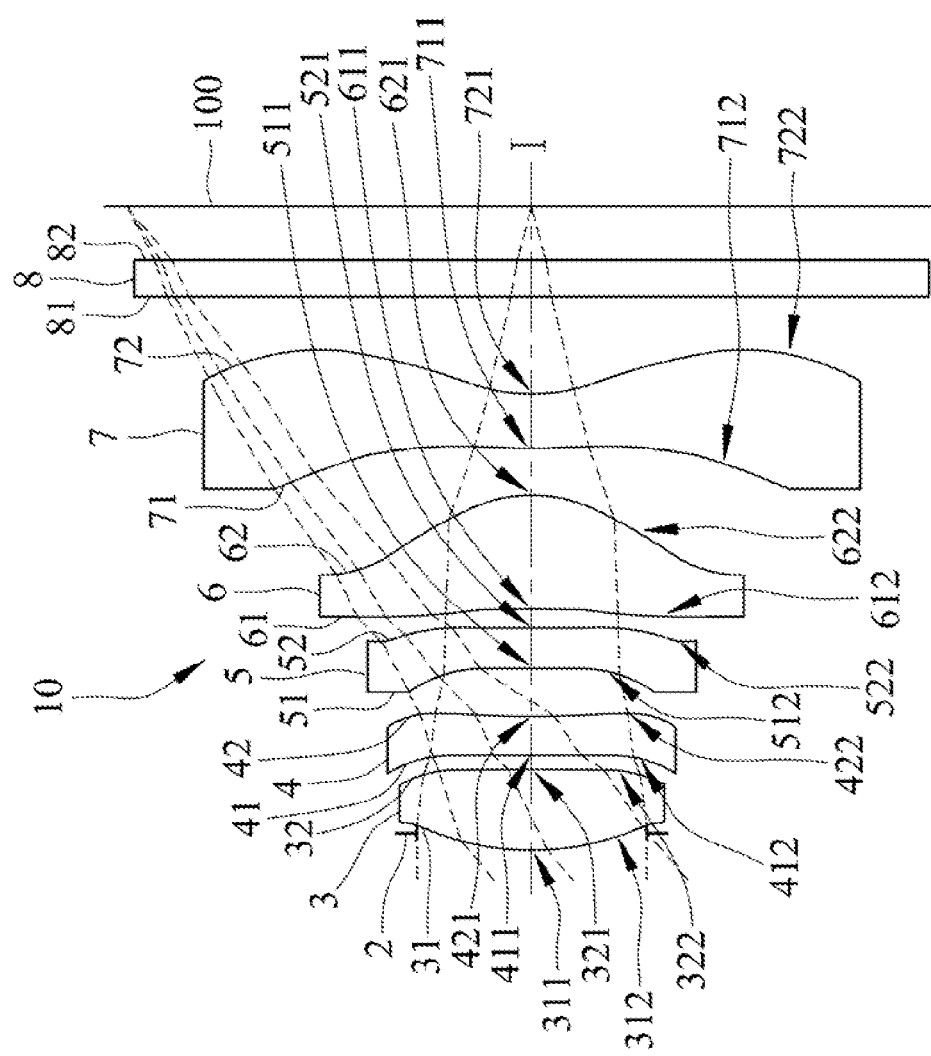
FIG. 2 is a schematic diagram that illustrates the first embodiment of an imaging lens according to the present invention.

Referring to FIG. 2, the first embodiment of an imaging lens 10 according to the present invention includes an aperture stop 2, a first lens element 3, a second lens element 4, a third lens element 5, a fourth lens element 6, a fifth lens element 7 and an optical filter 8 arranged in the given order along an optical axis (I) from an object side to an image side. The optical filter 8 is an infrared cut filter for selectively absorbing infrared light to thereby reduce imperfection of images formed at an image plane 100.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 100. Each of the object-side surfaces 31, 41, 51, 61, 71 and the image-side surfaces 32, 42, 52, 62, 72 is aspherical and has a center point coinciding with the optical axis (I).

The lens elements 3-7 are made of a plastic material in this embodiment, and at least one of the lens elements 3-7 may be made of other materials in other embodiments. In addition, each of the lens elements 3-7 has a refractive power.

In the first embodiment, which is depicted in FIG. 2, the first lens element 3 has a positive refractive power. The object-side surface 31 of the first lens element 3 is a convex surface that has a convex portion 311 in a vicinity of the optical axis (I), and a convex portion 312 in a vicinity of a periphery of the first lens element 3. The image-side surface 32 of the first lens element 3 has a concave portion 321 in a vicinity of the optical axis (I), and a convex portion 322 in a vicinity of the periphery of the first lens element 3.

The second lens element 4 has a negative refractive power. The object-side surface 41 of the second lens element 4 has a convex portion 411 in a vicinity of the optical axis (I), and a concave portion 412 in a vicinity of a periphery of the second lens element 4. The image-side surface 42 of the second lens element 4 has a concave portion 421 in a vicinity of the optical axis (I), and a convex portion 422 in a vicinity of the periphery of the second lens element 4.

The third lens element 5 has a negative refractive power. The object-side surface 51 of the third lens element 5 has a convex portion 511 in a vicinity of the optical axis (I), and a concave portion 512 in a vicinity of a periphery of the third lens element 5. The image-side surface 52 of the third lens element 5 has a concave portion 521 in a vicinity of the optical axis (I), and a convex portion 522 in a vicinity of the periphery of the third lens element 5.

The fourth lens element 6 has a positive refractive power. The object-side surface 61 of the fourth lens element 6 has a concave portion 611 in a vicinity of the optical axis (I), and a convex portion 612 in a vicinity of a periphery of the fourth lens element 6. The image-side surface 62 of the fourth lens element 6 is a convex surface that has a convex portion 621 in a vicinity of the optical axis (I), and a convex portion 622 in a vicinity of the periphery of the fourth lens element 6.

The fifth lens element 7 has a negative refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

In the first embodiment, the imaging lens 10 does not include any lens element with a refractive power other than the aforesaid lens elements 3-7.

Shown in FIG. 3 is a table that lists values of some optical data corresponding to the surfaces 31-81, 32-82 of the first embodiment. The imaging lens 10 has an overall system effective focal length (EFL) of 2.632 mm, a half field-of-view (HFOV) of 39.882°, an F-number of 2.050, and a system length (TTL) of 3.648 mm. TTL refers to a distance between the object-side surface 31 of the first lens element 3 and the image plane 100 at the optical axis (I).

In this embodiment, each of the object-side surfaces 31-71 and the image-side surfaces 32-72 is aspherical, and satisfies the relationship of $$Z(Y) = \frac{Y^2}{R} \bigg/ \left(1 + \sqrt{1-(1+K)\frac{Y^2}{R^2}}\right) + \sum_{i=1}^{a} a_{2i} \times Y^{2i} \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents an $2i^{th}$ aspherical coefficient.

Shown in FIG. 4 is a table that lists values of some aspherical coefficients of the aforementioned relationship (1) corresponding to the first embodiment.

Relationships among some of the lens parameters corresponding to the first embodiment are listed in a column of FIG. 22 corresponding to the first embodiment. Note that some terminologies are defined as follows:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

T5 represents a thickness of the fifth lens element 7 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

G45 represents an air gap length between the fourth lens element 6 and the fifth lens element 7 at the optical axis (I);

Gaa represents a sum of the four air gap lengths among the first lens element 3, the second lens element 4, the third lens element 5, the fourth lens element 6 and the fifth lens element 7 at the optical axis (I), i.e., the sum of G12, G23, G34 and G45; and ALT represents a sum of the thicknesses of the lens elements 3-7 at the optical axis (I), i.e., the sum of T1, T2, T3, T4 and T5.

In addition, some referenced terminologies are defined herein, where:

BFL represents a distance at the optical axis (I) between the image-side surface 72 of the fifth lens element 7 and the image plane 100;

GSF represents an air gap length between the fifth lens element 7 and the optical filter 8 at the optical axis (I);

TF represents a thickness of the optical filter 8 at the optical axis (I);

GFP represents an air gap length between the optical filter 8 and the image plane 100 at the optical axis (I);

f1 represents a focal length of the first lens element 3;
f2 represents a focal length of the second lens element 4;
f3 represents a focal length of the third lens element 5;
f4 represents a focal length of the fourth lens element 6;
f5 represents a focal length of the fifth lens element 7;
n1 represents a refractive index of the first lens element 3;
n2 represents a refractive index of the second lens element 4;
n3 represents a refractive index of the third lens element 5;
n4 represents a refractive index of the fourth lens element 6;
n5 represents a refractive index of the fifth lens element 7;
v1 is an Abbe number of the first lens element 3;
v2 is an Abbe number of the second lens element 4;
v3 is an Abbe number of the third lens element 5;
v4 is an Abbe number of the fourth lens element 6; and
v5 is an Abbe number of the fifth lens element 7.

FIGS. 5(a) to 5(d) respectively show simulation results corresponding to longitudinal spherical aberration, sagittal astigmatism aberration, tangential astigmatism aberration, and distortion aberration of the first embodiment. In each of the simulation results, curves corresponding respectively to wavelengths of 470 nm, 555 nm, and 650 nm are shown.

Figure 5:
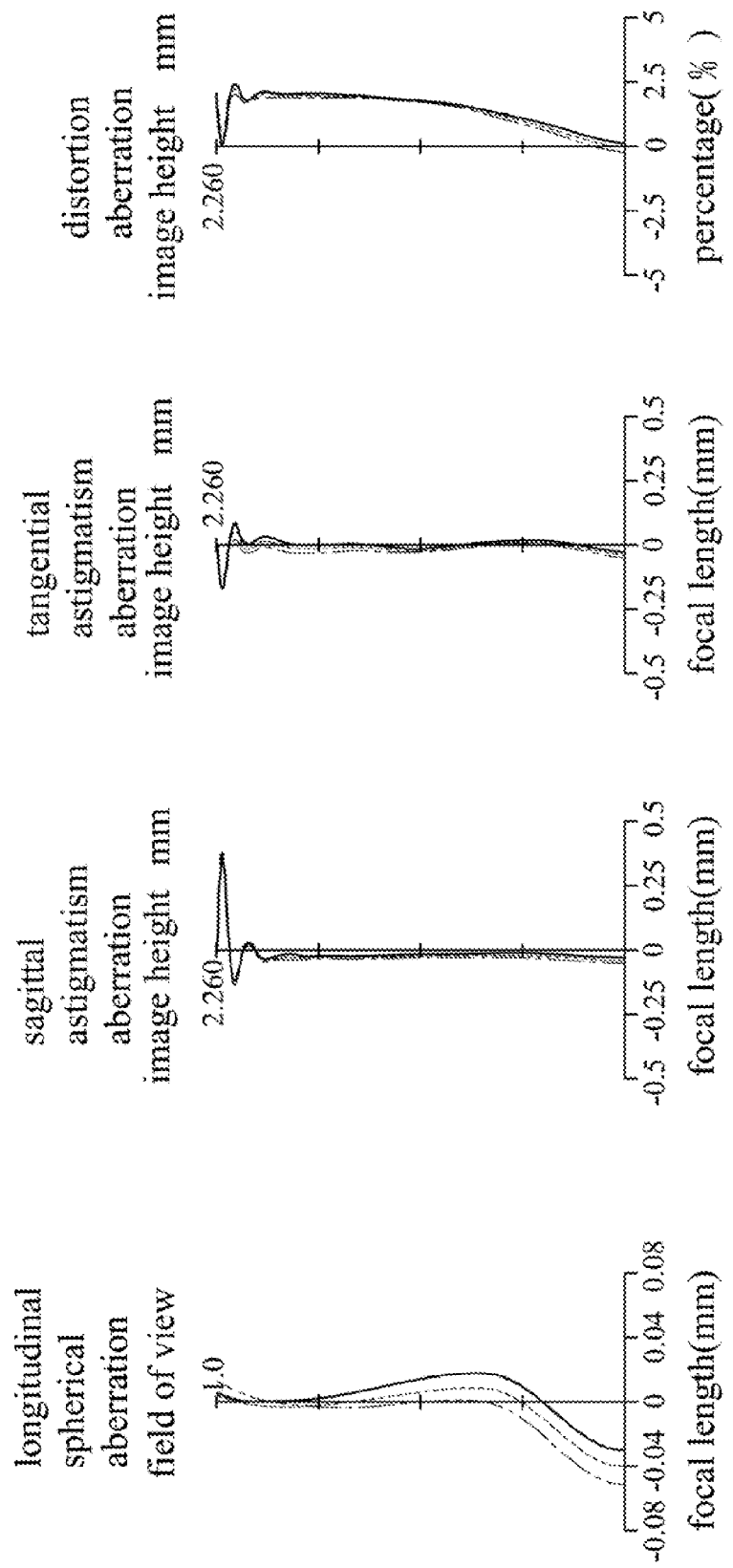
FIGS. 5(a) to 5(d) show different optical characteristics of the imaging lens of the first embodiment.

It can be understood from FIG. 5(a) that, since each of the curves corresponding to longitudinal spherical aberration has a focal length at each field of view (indicated by the vertical axis) that falls within the range of ±0.06 mm, the first embodiment is able to achieve a relatively low spherical aberration at each of the wavelengths. Furthermore, since the curves at each of the wavelengths of 470 nm, 555 nm, and 650 nm are close to each other, the first embodiment has a relatively low chromatic aberration.

It can be understood from FIGS. 5(b) and 5(c) that, since each of the curves falls within the range of ±0.5 mm of focal length, the first embodiment has a relatively low optical aberration.

Moreover, as shown in FIG. 5(d), since each of the curves corresponding to distortion aberration falls within the range of ±2.5%, the first embodiment is able to meet requirements in imaging quality of most optical systems.

In view of the above, even with the system length reduced down to 3.648 mm, the imaging lens 10 of the first embodiment is still able to achieve a relatively good optical performance. Therefore, the imaging lens 10 of the first embodiment may suit a thinner product design by virtue of a shorter system length and a wider image-capturing angle while maintaining relatively good optical performance.

Figure 6:
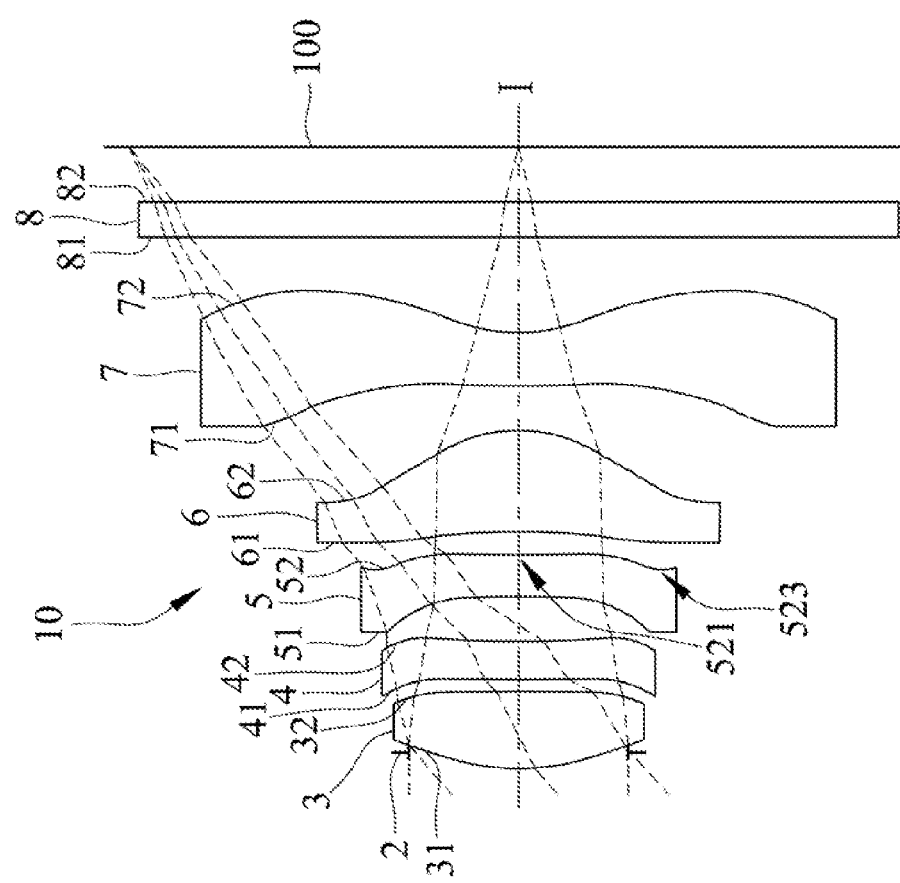
FIG. 6 is a schematic diagram that illustrates the second embodiment of an imaging lens according to the present invention.
Figure 9:
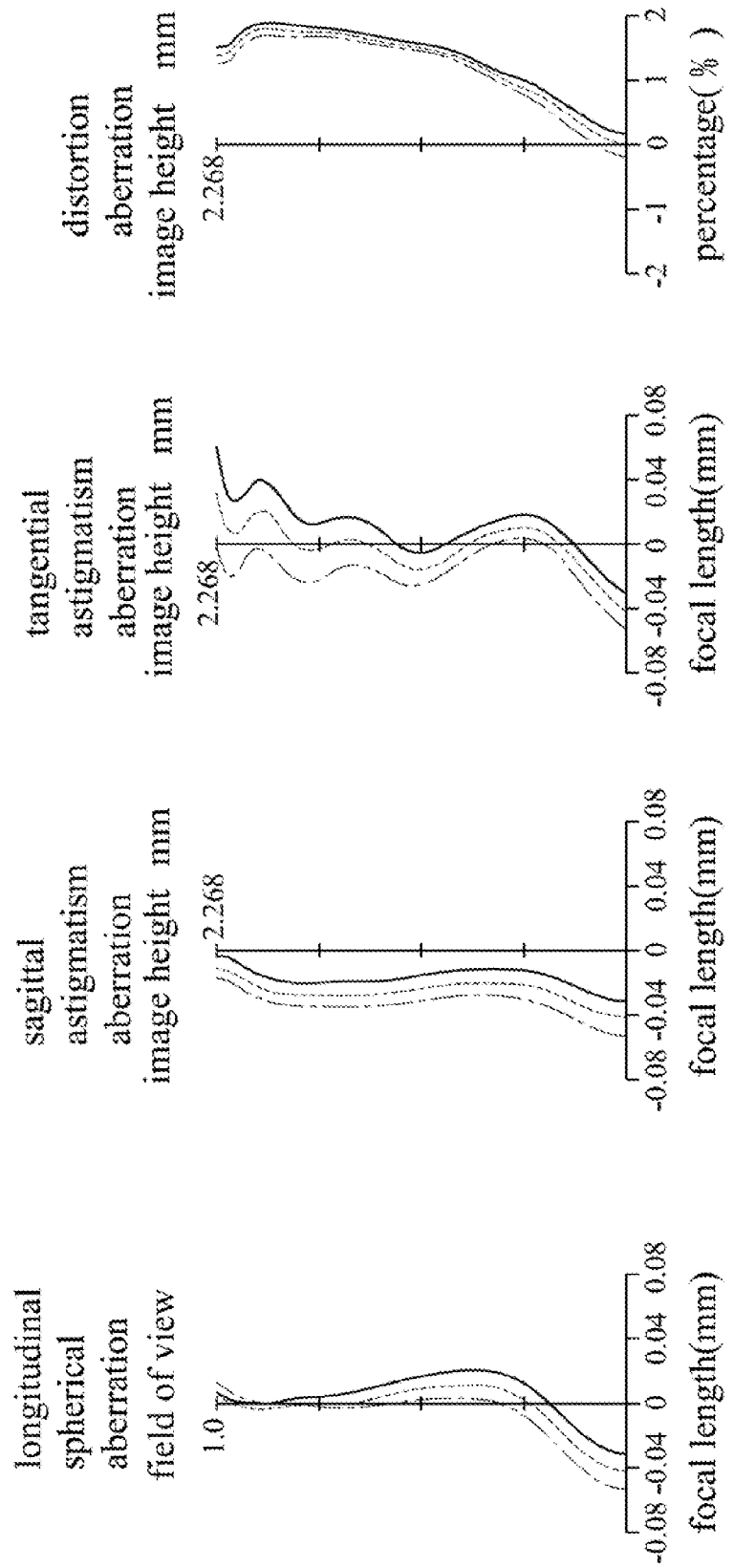
FIGS. 9(a) to 9(d) show different optical characteristics of the imaging lens of the second embodiment.

FIG. 6 illustrates the second embodiment of an imaging lens 10 according to the present invention, which has a configuration similar to that of the first embodiment. The differences between the first and second embodiments of the imaging lens 10 of this invention reside in some of the optical data, the aspherical coefficients and the lens parameters of the lens elements 3-7. Furthermore, in the second embodiment, the image-side surface 52 of the third lens element 5 is a concave surface that has a concave portion 521 in a vicinity of the optical axis (I) and a concave portion 523 in a vicinity of the periphery of the third lens element 5. In FIG. 6, the reference numerals of the concave portions and the convex portions that are the same as those of the first embodiment are omitted for the sake of clarity.

Shown in FIG. 7 is a table that lists values of some optical data corresponding to the surfaces 31-81, 32-82 of the second embodiment. The imaging lens 10 has an overall system focal length of 2.641 mm, an HFOV of 39.935°, an F-number of 2.050, and a system length of 3.646 mm.

Shown in FIG. 8 is a table that lists values of some aspherical coefficients of the aforementioned relationship (1) corresponding to the second embodiment.

Relationships among some of the aforementioned lens parameters corresponding to the second embodiment are listed in a column of FIG. 22 corresponding to the second embodiment.

FIGS. 9(a) to 9(d) respectively show simulation results corresponding to longitudinal spherical aberration, sagittal astigmatism aberration, tangential astigmatism aberration, and distortion aberration of the second embodiment. It can be understood from FIGS. 9(a) to 9(d) that the second embodiment is able to achieve a relatively good optical performance.

In comparison to the first embodiment, the second embodiment has a shorter TTL, a wider HFOV and better imaging quality, and may have a higher yield rate since the second embodiment is relatively easier to fabricate.

Figure 10:
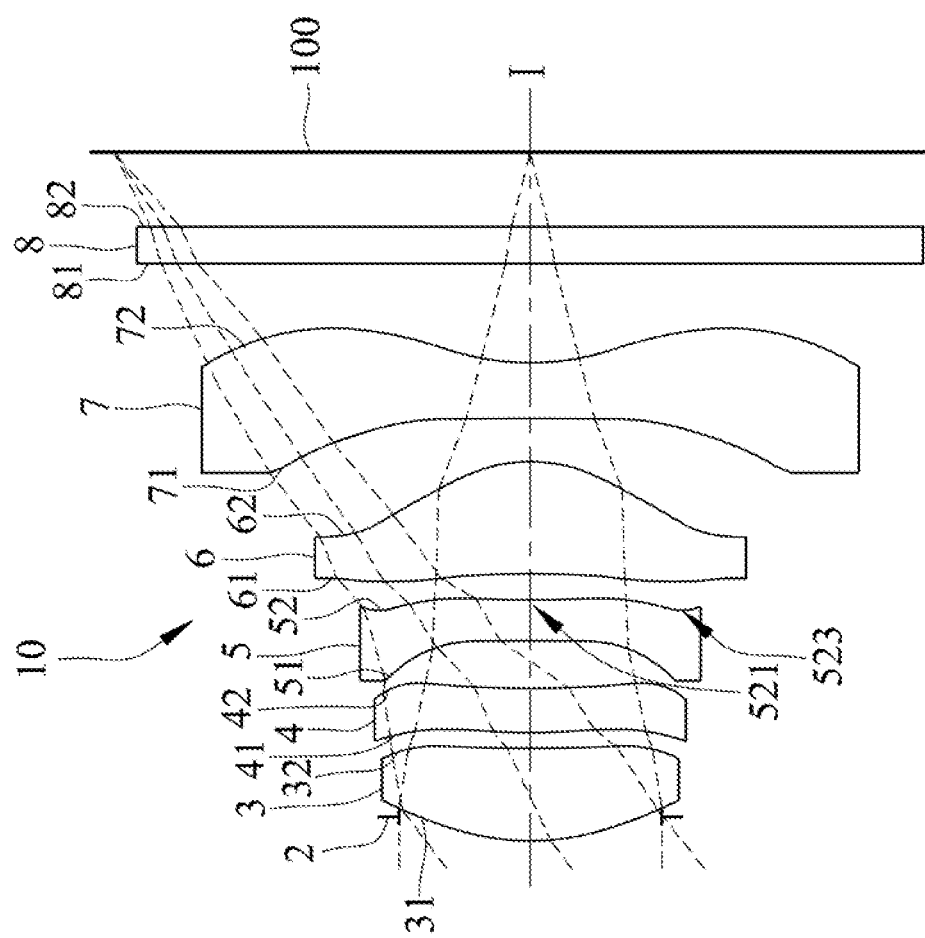
FIG. 10 is a schematic diagram that illustrates the third embodiment of an imaging lens according to the present invention.
Figures 13A, 13B, 13C, 13D:
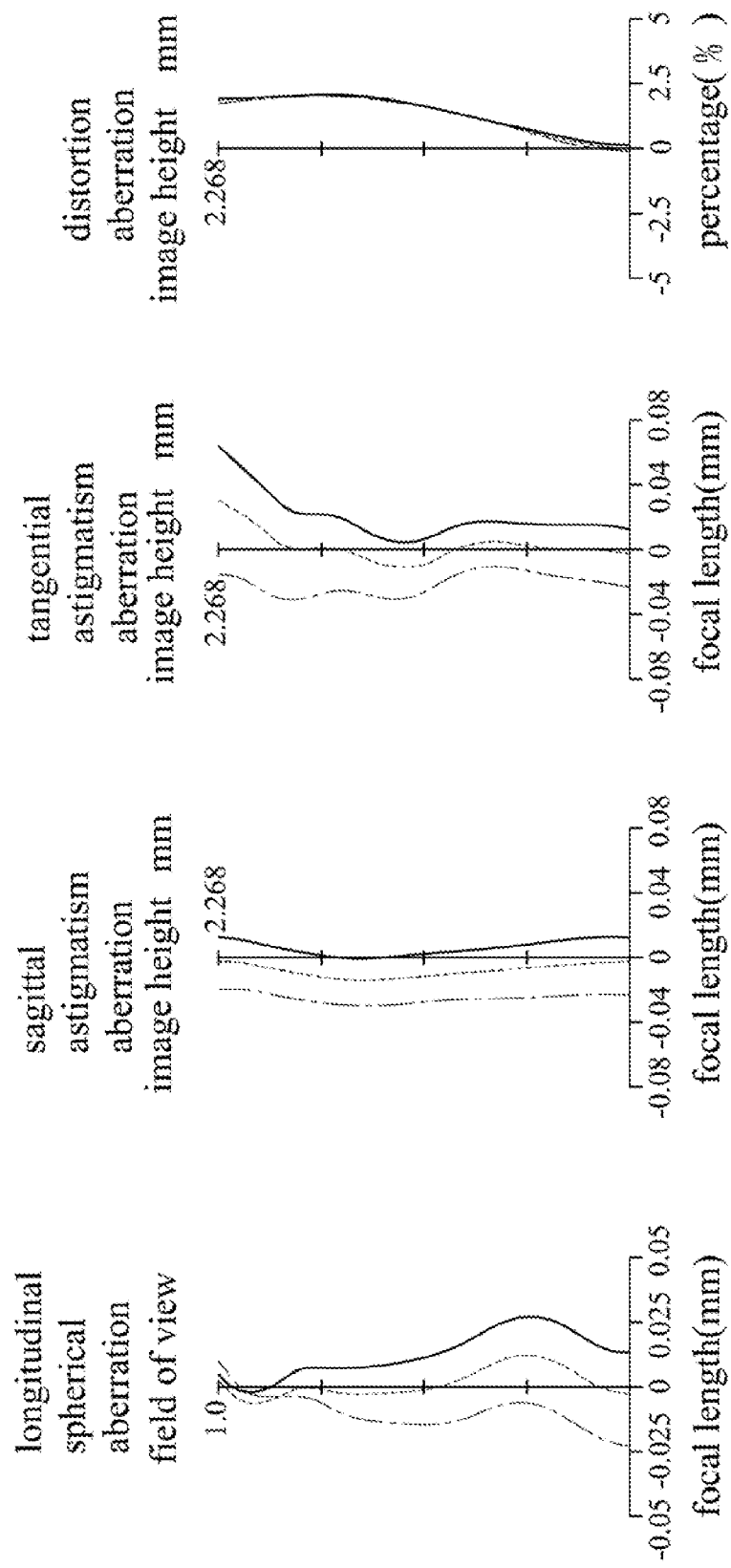
FIGS. 13(a) to 13(d) show different optical characteristics of the imaging lens of the third embodiment.

FIG. 10 illustrates the third embodiment of an imaging lens 10 according to the present invention, which has a configuration similar to that of the first embodiment. The differences between the first and third embodiments of the imaging lens 10 of this invention reside in some of the optical data, the aspherical coefficients and the lens parameters of the lens elements 3-7. Furthermore, in the third embodiment, the image-side surface 52 of the third lens element 5 is a concave surface that has a concave portion 521 in a vicinity of the optical axis (I) and a concave portion 523 in a vicinity of the periphery of the third lens element 5. In FIG. 10, the reference numerals of the concave portions and the convex portions that are the same as those of the first embodiment are omitted for the sake of clarity.

Shown in FIG. 11 is a table that lists values of some optical data corresponding to the surfaces 31-81, 32-82 of the third embodiment. The imaging lens 10 has an overall system focal length of 2.950 mm, an HFOV of 37.032°, an F-number of 2.050, and a system length of 3.800 mm.

Shown in FIG. 12 is a table that lists values of some aspherical coefficients of the aforementioned relationship (1) corresponding to the third embodiment.

Relationships among some of the aforementioned lens parameters corresponding to the third embodiment are listed in a column of FIG. 22 corresponding to the third embodiment.

FIGS. 13(a) to 13(d) respectively show simulation results corresponding to longitudinal spherical aberration, sagittal astigmatism aberration, tangential, astigmatism aberration, and distortion aberration of the third embodiment. It can be understood from FIGS. 13(a) to 13(d) that the third embodiment is able to achieve a relatively good optical performance.

In comparison to the first embodiment, the third embodiment has better imaging quality, and may have a higher yield rate since the third embodiment is relatively easier to fabricate.

Figure 14:
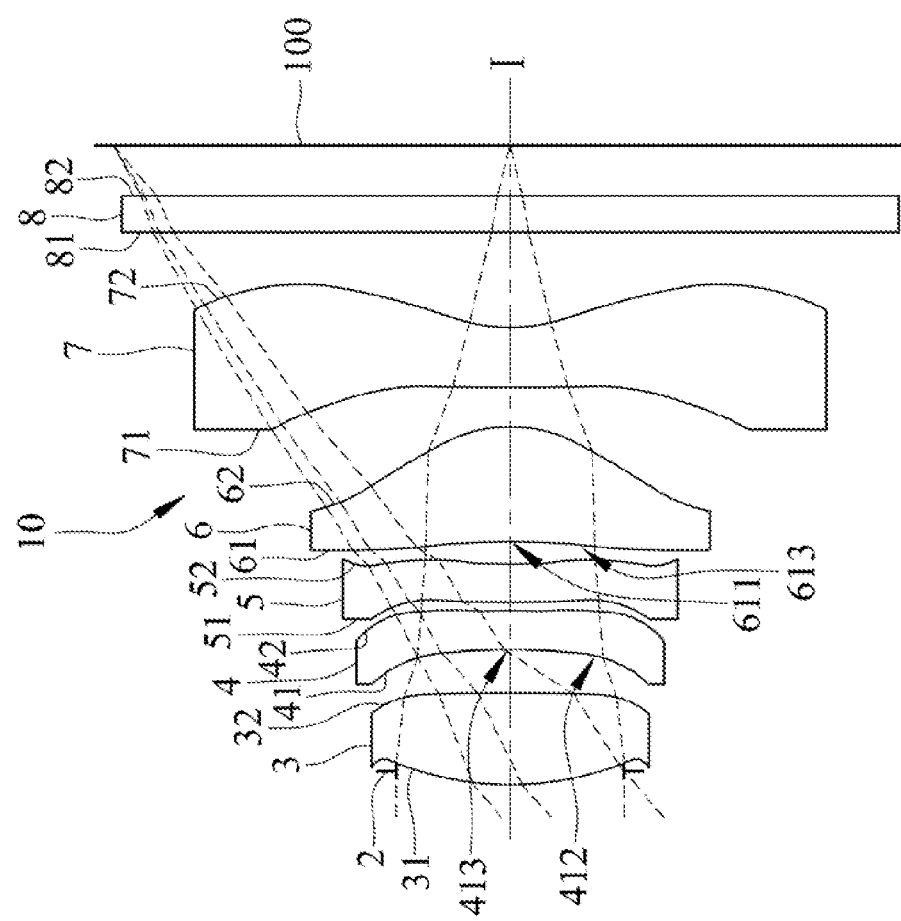
FIG. 14 is a schematic diagram that illustrates the fourth embodiment of an imaging lens according to the present invention.
Figures 17A, 17B, 17C, 17D:
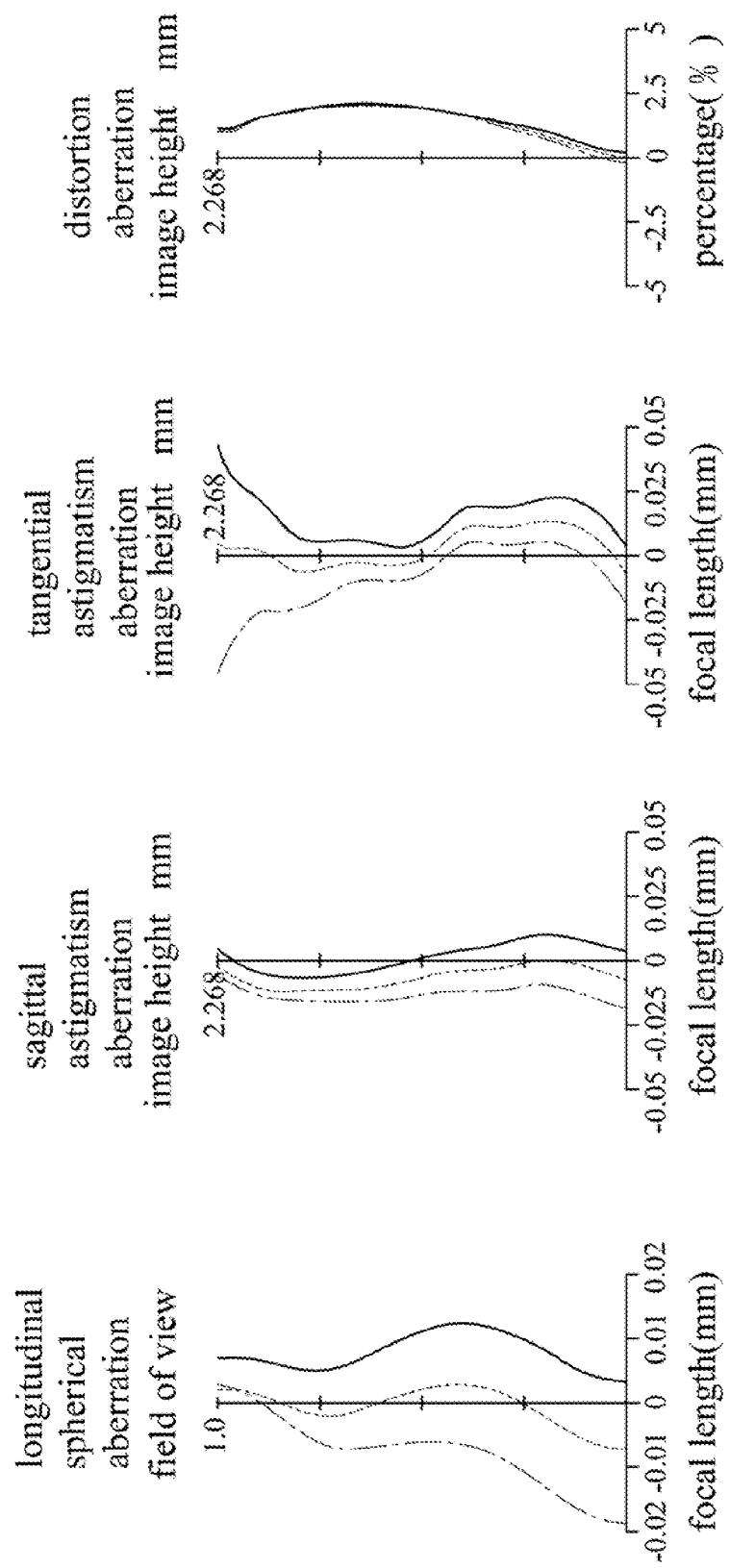
FIGS. 17(a) to 17(d) show different optical characteristics of the imaging lens of the fourth embodiment.

FIG. 14 illustrates the fourth embodiment of an imaging lens 10 according to the present invention, which has a configuration similar to that of the first embodiment. The differences between the first and fourth embodiments of the imaging lens 10 of this invention reside in some of the optical data, the aspherical coefficients and the lens parameters of the lens elements 3-7. Furthermore, in the fourth embodiment, the object-side surface 41 of the second lens element 4 is a concave surface that has a concave portion 413 in a vicinity of the optical axis (I), and a concave portion 412 in a vicinity of the periphery of the second lens element 4. The third lens element 5 has a positive refractive power. The object-side surface 61 of the fourth lens element 6 is a concave surface that has a concave portion 611 in a vicinity of the optical axis (I), and a concave portion 613 in a vicinity of the periphery of the fourth lens element 6. In FIG. 14, the reference numerals of the concave portions and the convex portions that are the same as those of the first embodiment are omitted for the sake of clarity.

Shown in FIG. 15 is a table that lists values of some optical data corresponding to the surfaces 31-81, 32-82 of the fourth embodiment. The imaging lens 10 has an overall system focal length of 2.654 mm, an HFOV of 40.145°, an F-number of 2.050, and a system length of 3.679 mm.

Shown in FIG. 16 is a table that lists values of some aspherical coefficients of the aforementioned relationship (1) corresponding to the fourth embodiment.

Relationships among some of the aforementioned lens parameters corresponding to the fourth embodiment are listed in a column of FIG. 22 corresponding to the fourth embodiment.

FIGS. 17(a) to 17(d) respectively show simulation results corresponding to longitudinal spherical aberration, sagittal astigmatism aberration, tangential astigmatism aberration, and distortion aberration of the fourth embodiment. It can be understood from FIGS. 17(a) to 17(d) that the fourth embodiment is able to achieve a relatively good optical performance.

In comparison to the first embodiment, the fourth embodiment has a wider HFOV and better imaging quality, and may have a higher yield rate since the fourth embodiment is relatively easier to fabricate.

Figure 18:
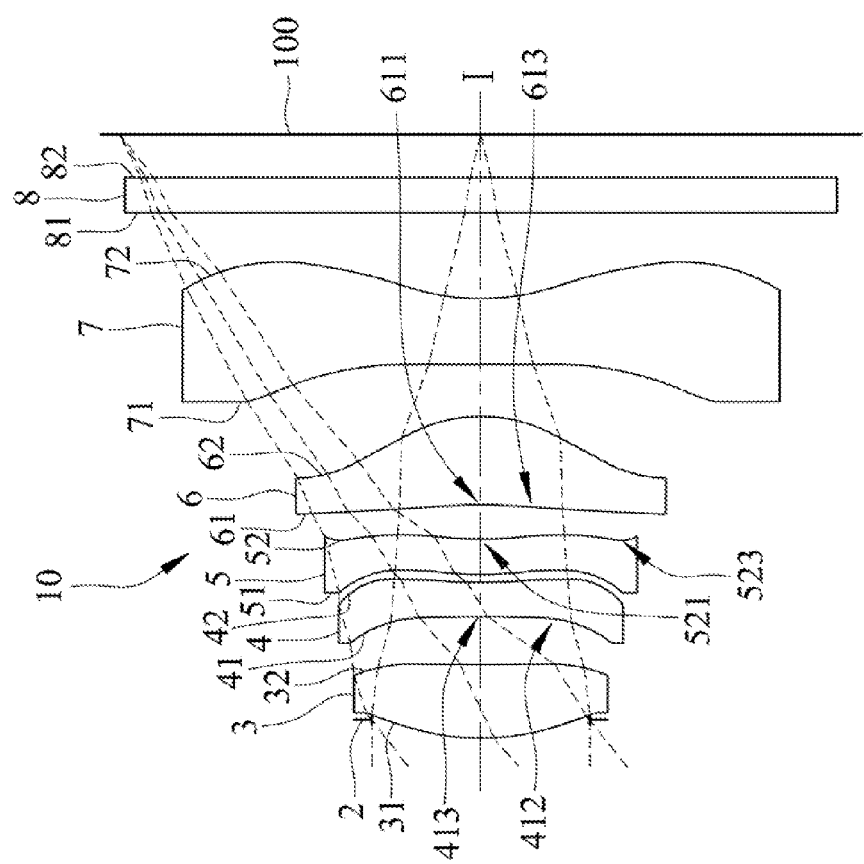
FIG. 18 is a schematic diagram that illustrates the fifth embodiment of an imaging lens according to the present invention.
Figure 21:
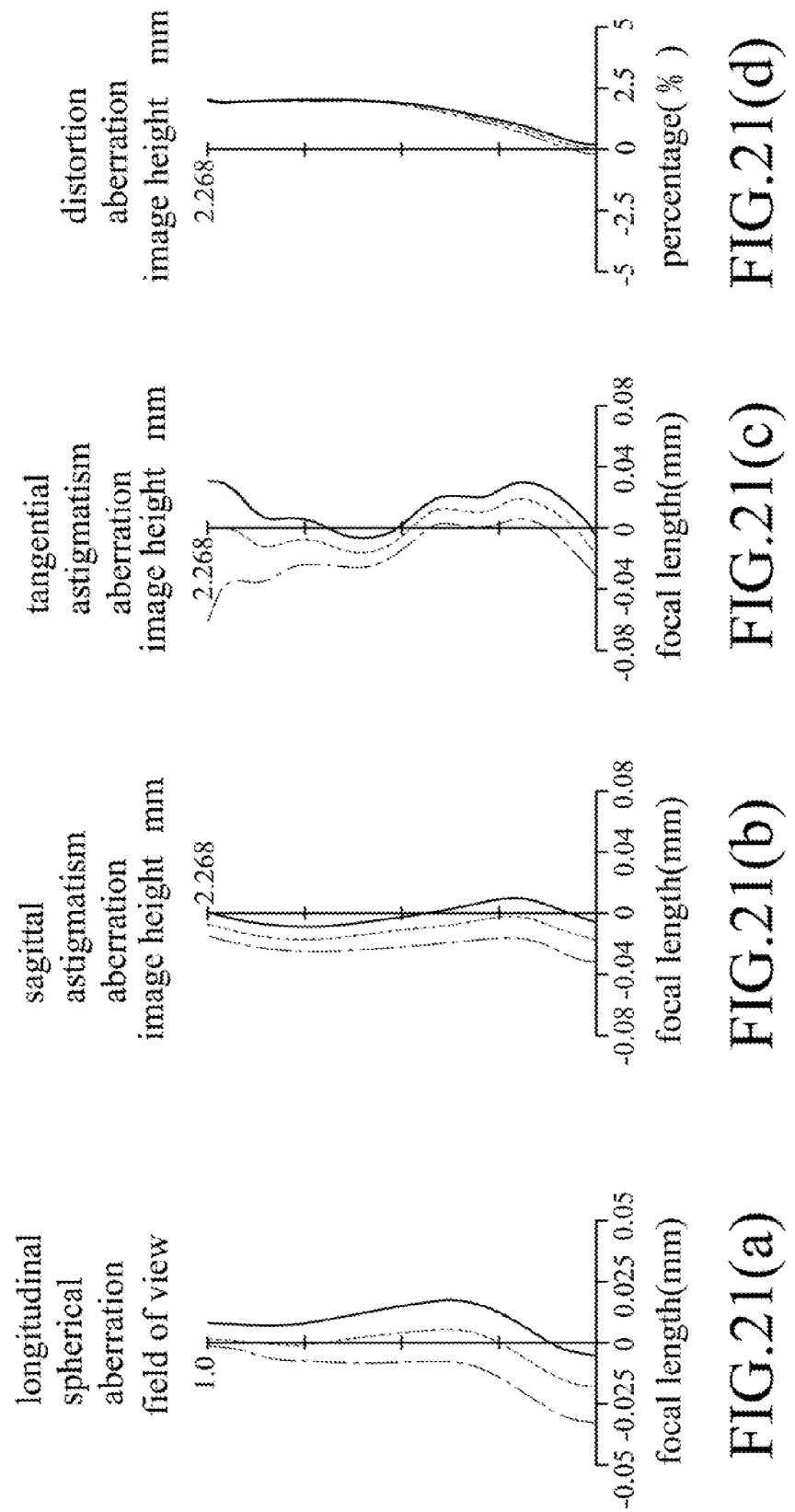
FIGS. 21(a) to 21(d) show different optical characteristics of the imaging lens of the fifth embodiment.

FIG. 18 illustrates the fifth embodiment of an imaging lens 10 according to the present invention, which has a configuration similar to that of the first embodiment. The differences between the first and fifth embodiments of the imaging lens 10 of this invention reside in some of the optical data, the aspherical coefficients and the lens parameters of the lens elements 3-7. Furthermore, in the fifth embodiment, the object-side surface 41 of the second lens element 4 is a concave surface that has a concave portion 413 in a vicinity of the optical axis (I), and a concave portion 412 in a vicinity of the periphery of the second lens element 4. The third lens element 5 has a positive refractive power. The image-side surface 52 of the third lens element 5 is a concave surface that has a concave portion 521 in a vicinity of the optical axis (I), and a concave portion 523 in a vicinity of the periphery of the third lens element 5. The object-side surface 61 of the fourth lens element 6 is a concave surface that has a concave portion 611 in a vicinity of the optical axis (I), and a concave portion 613 in a vicinity of the periphery of the fourth lens element 6. In FIG. 18, the reference numerals of the concave portions and the convex portions that are the same as those of the first embodiment are omitted for the sake of clarity.

Shown in FIG. 19 is a table that lists values of some optical data corresponding to the surfaces 31-81, 32-82 of the fifth embodiment. The imaging lens 10 has an overall system focal length of 2.815 mm, an HFOV of 38.160°, an F-number of 2.050, and a system length of 3.800 mm.

Shown in FIG. 20 is a table that lists values of some aspherical coefficients of the aforementioned relationship (1) corresponding to the fifth embodiment.

Relationships among some of the aforementioned lens parameters corresponding to the fifth embodiment are listed in a column of FIG. 22 corresponding to the fifth embodiment.

FIGS. 21(a) to 21(d) respectively show simulation results corresponding to longitudinal spherical aberration, sagittal astigmatism aberration, tangential astigmatism aberration, and distortion aberration of the fifth embodiment. It can be understood from FIGS. 21(a) to 21(d) that the fifth embodiment is able to achieve a relatively good optical performance.

In comparison to the first embodiment, the fifth embodiment has better imaging quality, and may have a higher yield rate since the fifth embodiment is relatively easier to fabricate.

Shown in FIG. 22 is a table that lists the aforesaid relationships among some of the aforementioned lens parameters corresponding to the five embodiments for comparison. When each of the lens parameters of the imaging lens 10 according to this invention satisfies the following optical relationships, the optical performance is still relatively good even with the reduced system length:

$$T5/G23 \geq 1.1, T5/G34 \geq 1.9 \text{ and } T5/T3 \geq 1.3 \tag{1}$$

Since the fifth lens element 7 has a relatively large optical effective diameter, reduction in T5 is limited in consideration of lens fabrication techniques. In addition, since reductions in G23, G34 and T3 are advantageous for reducing the system length of the imaging lens 10, T5/G23, T5/G34 and T5/T3 should tend to be large. However, while the thicknesses of the lens elements and the air gap lengths are reduced, ratios thereamong should be proper to avoid any one of the lens parameters being excessively large that may disfavor the overall thickness reduction of the imaging lens 10, or to avoid any one of the lens parameters being excessively small that may cause difficulty in assembly. Preferably, $1.1 \leq T5/G23 \leq 8.5$, $1.9 \leq T5/G34 \leq 2.9$, and $1.3 \leq T5/T3 \leq 1.8$.

$$T4/T2 \geq 2.9, T4/T3 \geq 2.5 \text{ and } T4/(T3+T2) \geq 1.2 \tag{2}$$

Because the fourth lens element 6 has the positive refractive power and the concave portion 611, reduction in T4 is thereby limited. In addition, since reducing T2 and T3 is advantageous for reduction of the system length of the imaging lens 10, T4/T2, T4/T3 and T4/(T3+T2) should tend to be large. However, while the thicknesses of the lens elements and the air gap lengths are reduced, ratios thereamong should be proper to avoid any one of the lens parameters being excessively large that may disfavor the overall thickness reduction of the imaging lens 10, or to avoid any one of the lens parameters being excessively small that may cause difficulty in assembly. Preferably, $2.9 \leq T4/T2 \leq 3.3$, $2.5 \leq T4/T3 \leq 3.3$ and $1.2 \leq T4/(T3+T2) \leq 1.8$.

$$EFL/T3 \geq 9 \text{ and } EFL/T5 \geq 7.8 \tag{3}$$

Under these conditions, the imaging lens 10 may have both better imaging quality and higher yield rate. However, while the thicknesses of the lens elements are reduced, ratios thereamong should be proper to avoid any one of the lens parameters being excessively large that may disfavor the overall thickness reduction of the imaging lens 10, or to avoid any one of the lens parameters being excessively small that may cause difficulty in assembly. Preferably, $9 \leq EFL/T3 \leq 14$ and $7.8 \leq EFL/T5 \leq 10.2$.

$$T1/T5 \geq 1.3 \tag{4}$$

Ratios of thicknesses of the lens elements should be proper to avoid any one of the lens elements being excessively thick that may disfavor the overall thickness reduction of the imaging lens 10, or to avoid any one of the lens elements being excessively thin that may cause difficulty in assembly. Preferably, $1.3 \leq T1/T5 \leq 2.1$.

$$G45 > G34, G45/(G12+G34) \geq 1.2, ALT/G23 \geq 6.8, ALT/T3 \geq 7, Gaa/T3 \geq 2.3 \text{ and } Gaa/T5 \geq 2.2 \tag{5}$$

Ratios among these lens parameters should be proper to avoid any one of the lens parameters being excessively large that may disfavor the overall thickness reduction of the imaging lens 10, or to avoid any one of the ratios being excessively small that may cause difficulty in assembly. Preferably, $1.2 \leq G45/(G12+G34) \leq 1.8$, $6.8 \leq ALT/G23 \leq 39.8$, $7 \leq ALT/T3 \leq 9.2$, $2.3 \leq Gaa/T3 \leq 4.3$ and $2.2 \leq Gaa/T5 \leq 2.9$.

Although the design of an optical system is generally associated with unpredictability, satisfaction of the aforementioned relationships may enable the imaging lens 10 to have reductions in the system length and the F-number, to have a wider field of view, to enhance imaging quality, or to have a relatively higher yield rate of assembly, thereby alleviating at least one drawback of the prior art.

To sum up, effects and advantages of the imaging lens 10 according to the present invention are described hereinafter.

1. The positive refractive power of the fourth lens element 6 may provide a part of overall positive refractive power required by the imaging lens 10, thereby favoring reduction in the system length of the imaging lens 10. In addition, by virtue of cooperation among the convex portion 322, the concave portion 412, the concave portion 421, the convex portion 422, the concave portion 512, the concave portion 611 and the convex portion 711, the imaging quality of the imaging lens 10 can be improved.

2. Through design of the relevant lens parameters, optical aberrations, such as spherical aberration, may be reduced or even eliminated. Further, through surface design and arrangement of the lens elements 3-7, even with the system length reduced, optical aberrations may still be reduced or even eliminated, resulting in relatively good optical performance.

3. Through the aforesaid five embodiments, it is evident that the system length of this invention may be reduced down to below 4 mm, so as to facilitate developing thinner relevant products with economic benefits.

Figure 23:
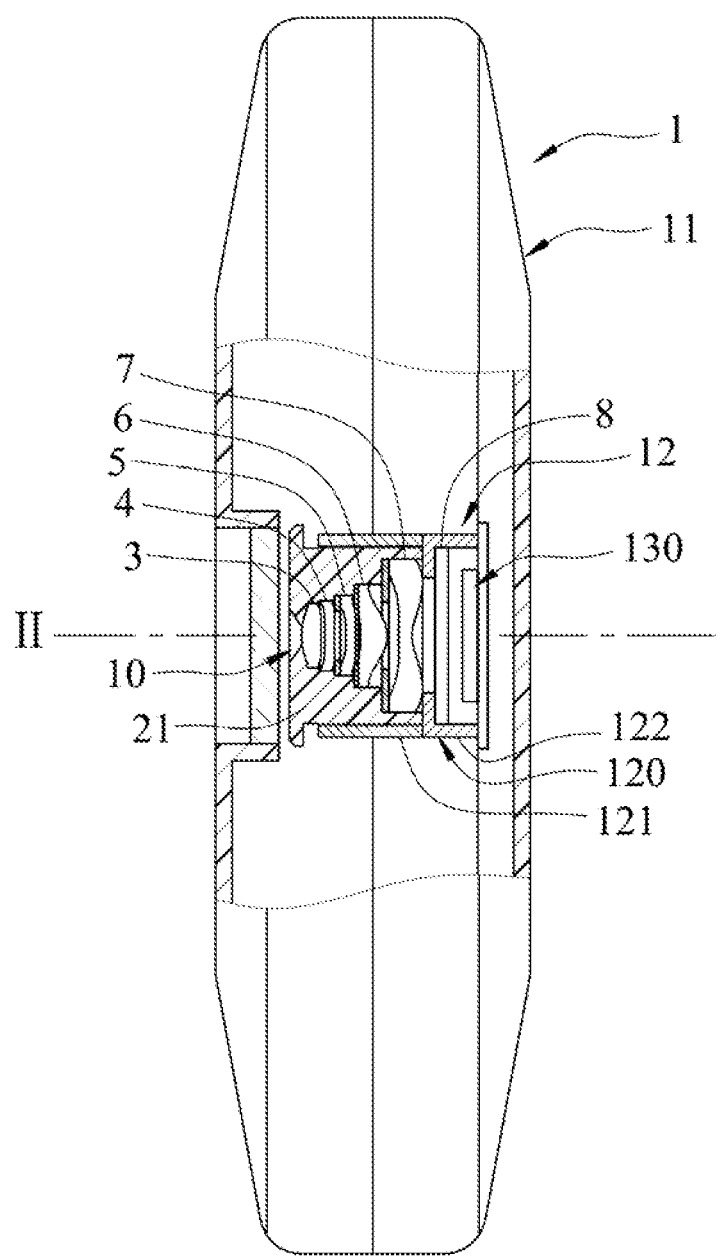
FIG. 23 is a schematic partly sectional view to illustrate a first exemplary application of the imaging lens of the present invention.

Shown in FIG. 23 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1.

The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 24:
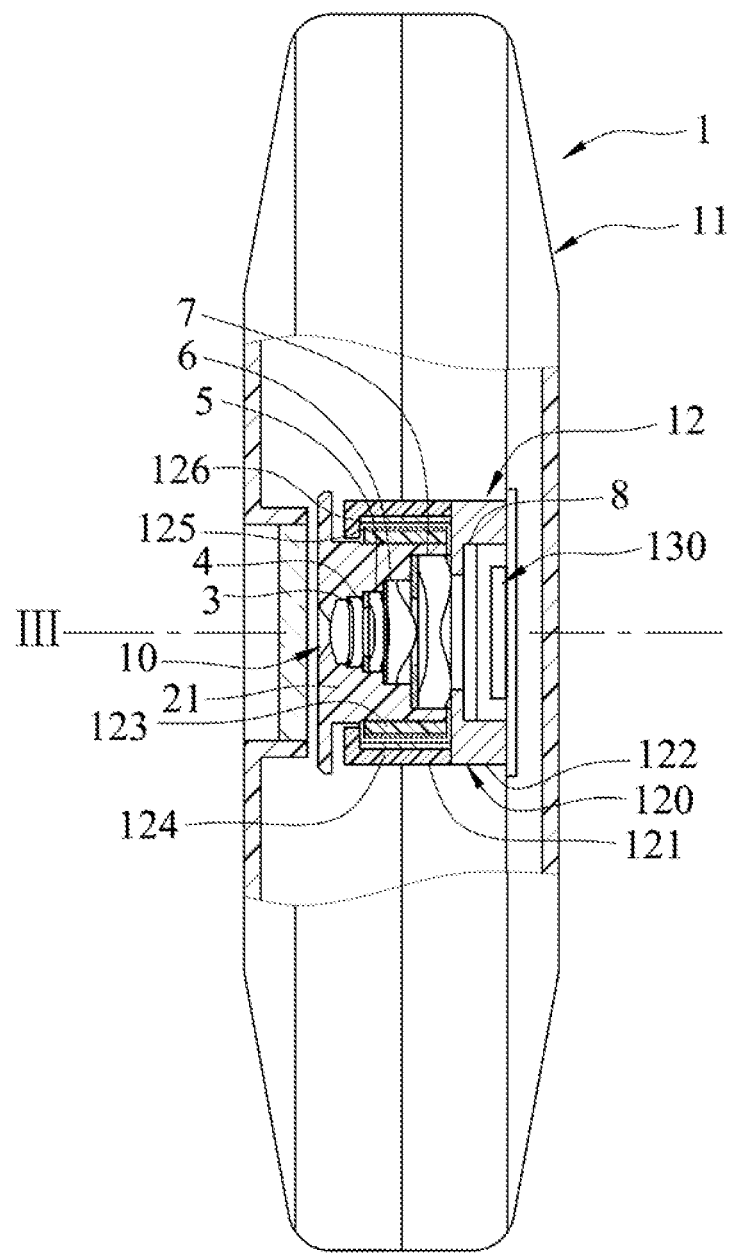
FIG. 24 is a schematic partly sectional view to illustrate a second exemplary application of the imaging lens of the present invention.

Shown in FIG. 24 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil. 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, a first lens element, a second lens element, a third lens element, a fourth lens element and a fifth lens element arranged in order from an object side to an image side along an optical axis of said imaging lens, each of said first lens element, said second lens element, said third lens element, said fourth lens element and said fifth lens element having a refractive power, an object-side surface facing toward the object side, and an image-side surface facing toward the image side, wherein:

said imaging lens comprises only five lens elements;

said image-side surface of said first lens element has a convex portion in a vicinity of a periphery of said first lens element;

said object-side surface of said second lens element has a concave portion in a vicinity of a periphery of said second lens element, and said image-side surface of said second lens element has a concave portion in a vicinity of the optical axis, and a convex portion in a vicinity of said periphery of said second lens element;

said object-side surface of said third lens element has a concave portion in a vicinity of a periphery of said third lens element;

said fourth lens element has a positive refractive power, and said object-side surface of said fourth lens element has a concave portion in a vicinity of the optical axis;

said object-side surface of said fifth lens element has a convex portion in a vicinity of the optical axis;

said imaging lens satisfies $T5/G23 \geq 1.1$ and $G45 > G34$, where G23 represents an air gap length between said second lens element and said third lens element at the optical axis, G34 represents an air gap length between said third lens element and said fourth lens element at the optical axis, G45 represents an air gap length between said fourth lens element and said fifth lens element at the optical axis, and T5 represents a thickness of said fifth lens element at the optical axis; and said imaging lens further satisfies $Gaa/T3 \geq 2.3$, where Gaa represents a sum of four air gap lengths among said first lens element, said second lens element, said third lens element, said fourth lens element and said fifth lens element at the optical axis, and T3 represents the thickness of said third lens element at the optical axis.

2. The imaging lens as claimed in claim 1, further satisfying $ALT/G23 \geq 6.8$, where ALT represents a sum of thicknesses of said first lens element, said second lens element, said third lens element, said fourth lens element and said fifth lens element at the optical axis, and said second lens element has a negative refractive power.

3. The imaging lens as claimed in claim 2, further satisfying $T4/T2 \geq 2.9$, where T2 represents the thickness of said second lens element at the optical axis, and T4 represents the thickness of said fourth lens element at the optical axis.

4. The imaging lens as claimed in claim 2, further satisfying $EFL/T3 \geq 9$, where EFL represents a system focal length of said imaging lens.

5. The imaging lens as claimed in claim 1, further satisfying $T4/T3 \geq 2.5$, where T4 represents a thickness of said fourth lens element at the optical axis, and said second lens element has a negative refractive power.

6. The imaging lens as claimed in claim 5, further satisfying $T1/T5 \geq 1.3$, where T1 represents a thickness of said first lens element at the optical axis.

7. The imaging lens as claimed in claim 5, further satisfying $T5/G34 \geq 1.9$.

8. The imaging lens as claimed in claim 5, further satisfying $G45/(G12+G34) \geq 1.2$, where G12 represents an air gap length between said first lens element and said second lens element at the optical axis.

9. The imaging lens as claimed in claim 1, further satisfying $EFL/T5 \geq 7.8$, where EFL represents a system focal length of said imaging lens.

10. The imaging lens as claimed in claim 9, further satisfying $ALT/T3 \geq 7$, where ALT represents a sum of thicknesses of said first lens element, said second lens element, said third lens element, said fourth lens element and said fifth lens element at the optical axis.

11. The imaging lens as claimed in claim 9, further satisfying $T5/T3 \geq 1.3$.

12. The imaging lens as claimed in claim 9, further satisfying $T4/(T2+T3) \geq 1.2$, where T2 represents a thickness of said second lens element at the optical axis, and T4 represents a thickness of said fourth lens element at the optical axis.

13. The imaging lens as claimed in claim 1, further satisfying $T5/T3 \geq 1.3$, where said second lens element has a negative refractive power.

14. The imaging lens as claimed in claim 13, further satisfying $G45/(G12+G34) \geq 1.2$, where G12 represents an air gap length between said first lens element and said second lens element at the optical axis.

15. The imaging lens as claimed in claim 13, further satisfying $Gaa/T5 \geq 2.2$.

16. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

17. The imaging lens as claimed in claim 1, wherein an Abbe number of said first lens element is greater than a sum of an Abbe number of said second lens element and an Abbe number of said third lens element.

* * * * *